United States Patent Office 3,393,446
Patented July 23, 1968

3,393,446
METHOD FOR JOINING ALUMINUM TO METALS
Ray C. Hughes, Ossining, Robert L. Bronnes, Irvington, and Richard C. Sweet, North Tarrytown, N.Y., assignors to North American Philips Company, Inc., New York, N.Y., a corporation of Delaware
No Drawing. Continuation-in-part of application Ser. No. 301,866, Aug. 13, 1963. This application May 23, 1966, Ser. No. 551,918
6 Claims. (Cl. 29—492)

This application is a continuation-in-part of application Ser. No. 301,866, filed Aug. 13, 1963.

The invention relates to a method of joining metals to metals and in particular to joining aluminum to another metal or metallized ceramic surface.

Aluminum and aluminum alloys are not susceptible to soldering with ordinary soft solder such as tin-lead or tin-silver compositions, due to the well-known tendency of aluminum to become covered with a thin tenaciously-adhering film of aluminum oxide which cannot be removed with ordinary fluxes.

Accordingly, it is a principal object of the invention to provide a method of joining aluminum to another metal requiring no fluxes.

This and further objects of the invention will appear as the specification progresses.

In the parent application, there has been described a method of metallizing ceramics for the purpose of joining them by brazing techniques to metals. In the technique therein described a sputtered metal film is applied to the surface of the ceramic which is then covered by a protective metal such as platinum or gold which can be brazed, or soldered to a metal surface. Essentially that technique is employed to join a metal, such as aluminum, which is solderable only with great difficulty, to another metal. However, although the aluminum oxide which covers the surface of the aluminum is covered with a metal film which tenaciously adheres thereto, this metal film also penetrates the oxide film and forms a bond with the underlying metal. Consequently, this metal-to-metal contact can serve, in some cases, as an electrically conductive connection to the underlying aluminum metal.

Thus, in accordance with the invention, a metal selected from the group consisting of titanium, tantalum and columbium is cathodically sputtered onto the aluminum in the manner described in the parent application. Over this metal layer a layer of platinum, and then gold is deposited, preferably by cathodic sputtering, also as described in the parent application. This sequence of platinum and then gold has been found to be particularly well-suited with respect to solderability. Surfaces of aluminum which have been coated in the described manner are well wetted by soft solders based upon Pb, Sn, In, and form therewith mechanically sound, durable, strong, and vacuum tight joints.

The following examples are illustrative of the invention.

Two samples of aluminum, one 2S grade, the other 24ST, were prepared as cylinders about ½ inch long by ½ inch diameter. Each cylinder was coated by cathodic sputtering with the following layers in indicated thickness:

|  | A. |
|---|---|
| Ti | 6600 |
| Pt | 6990 |
| Au | 18130 |

The coated pieces were noted to have a characteristic gold color. The faces of the metallized aluminum pieces were tinned with a solder composition of Sn 95–Ag 5, an appropriate flux being employed. The tinned faces of the aluminum pieces were then sweat-soldered to pre-tinned copper sheet. An effective joint was obtained; normal force was required to peel the copper away from the aluminum. Removal of the copper did not destroy the coating on the aluminum; a new solder joint could readily be made.

In a second instance, a similarly coated aluminum surface was soldered successfully to a piece of metallized aluminum oxide to form electrically insulated pads which were firmly attached to the aluminum part.

The invention is, moreover, not limited to joining aluminum to another metal or metallized surface. Other metals which are difficult to solder may also be joined in the manner described herein.

Accordingly, while the invention has been described in connection with specific examples and applications thereof, other modifications will be apparent to those skilled in this art without departing from the spirit and scope of the invention which is defined in the appended claims.

What is claimed is:

1. A method of joining aluminum to a second metal comprising the steps of depositing on the aluminum by cathodic sputtering a layer of a metal selected from the group consisting of tantalum, titanium, and columbium to form with said first metal a firm bond therewith, depositing over said metal layer successive layers of platinum and gold, and soldering the so-covered aluminum to the second metal.

2. A method of joining metals as claimed in claim 1 in which the second metal is a metallized surface of aluminum oxide.

3. A method of joining metals as claimed in claim 1 in which the metal layer deposited by cathodic sputtering is titanium and has a thickness of about 6600 A.

4. A method of joining metals as claimed in claim 3 in which the layer of platinum has a thickness of about 7000 A. and the layer of gold has a thickness of about 18,000 A.

5. A method of joining metals as claimed in claim 1 in which the metallized aluminum is joined to the second metal using a soft solder.

6. A method of joining metals as claimed in claim 5 in which the soft solder is Sn 95–Ag 5.

References Cited

UNITED STATES PATENTS

| 2,973,283 | 2/1961 | Hill | 29—199 X |
| 3,162,512 | 12/1964 | Robinson | 29—199 |
| 3,218,194 | 11/1965 | Maissel | 117—217 |
| 3,265,473 | 8/1966 | Gallet | 29—199 X |
| 3,271,285 | 9/1966 | Skoda | 204—192 |
| 3,339,267 | 9/1967 | Bronnes | 29—473.1 |

FOREIGN PATENTS 592,733 9/1947 Great Britain.

JOHN F. CAMPBELL, *Primary Examiner.*

R. F. DROPKIN, *Assistant Examiner.*